Dec. 10, 1929.                H. BOUTILLON                1,739,437
                        DISTRIBUTING DEVICE FOR LIQUIDS
                        Filed March 31, 1924        6 Sheets-Sheet 1
Fig.1.                    Fig.12.              Fig.2.
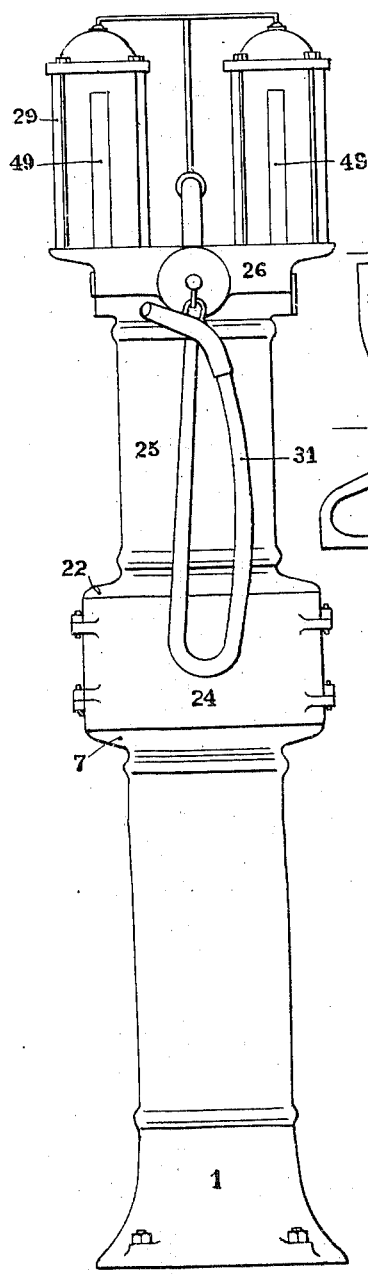
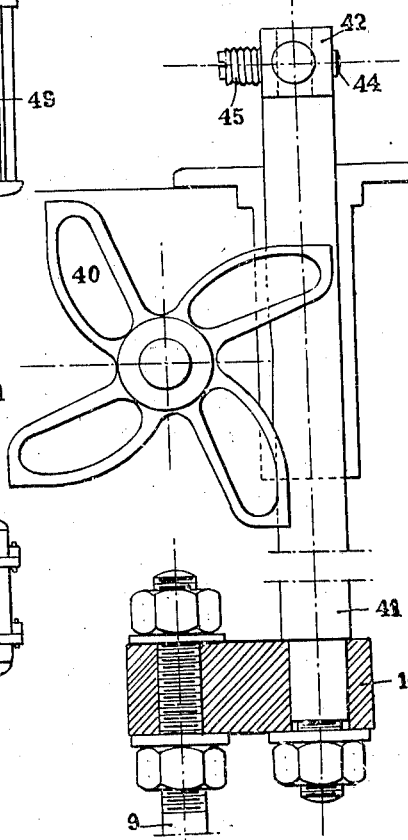
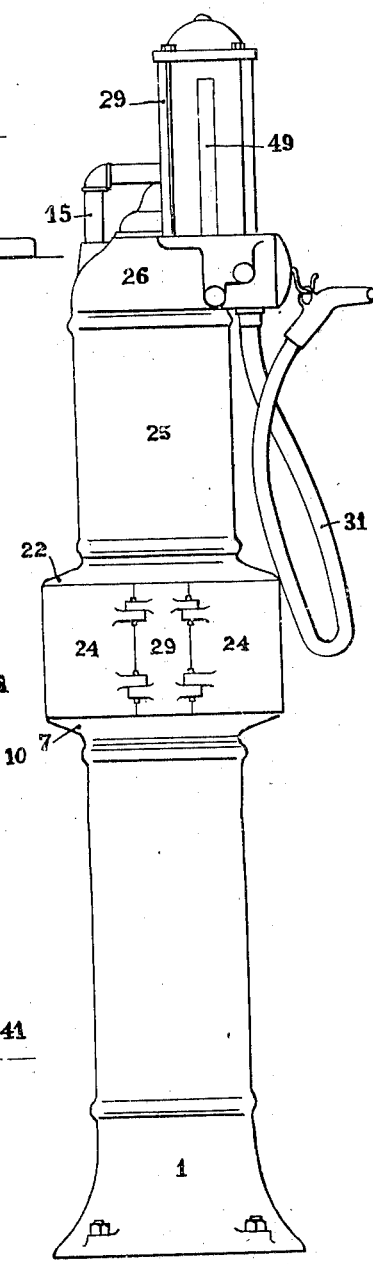
Fig.16.
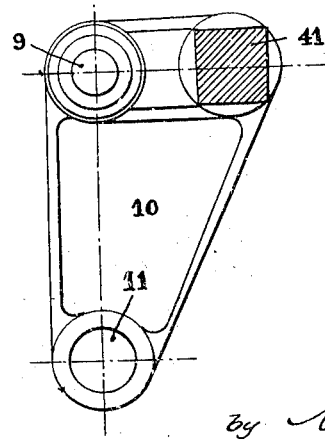
Inventor.
Henri Boutillon
by Munn & Co.
Attys.

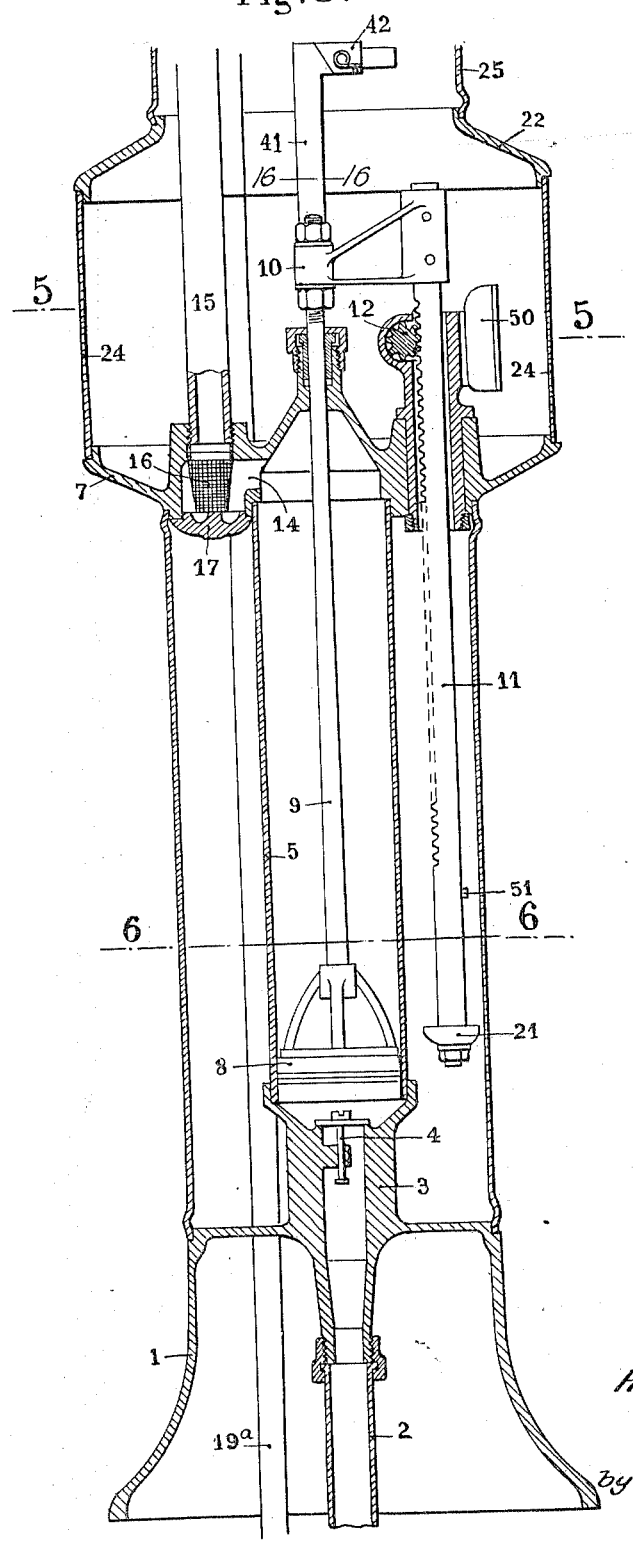

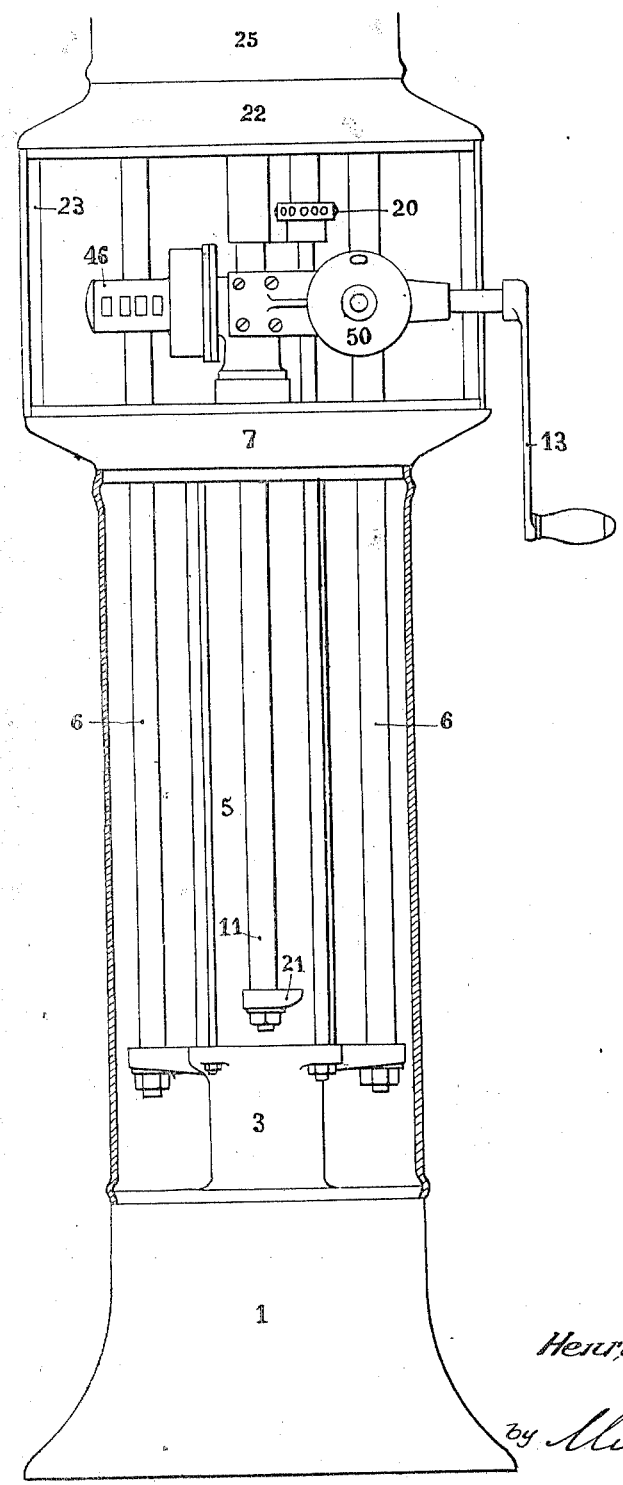

Dec. 10, 1929.  H. BOUTILLON  1,739,437
DISTRIBUTING DEVICE FOR LIQUIDS
Filed March 31, 1924    6 Sheets-Sheet 4
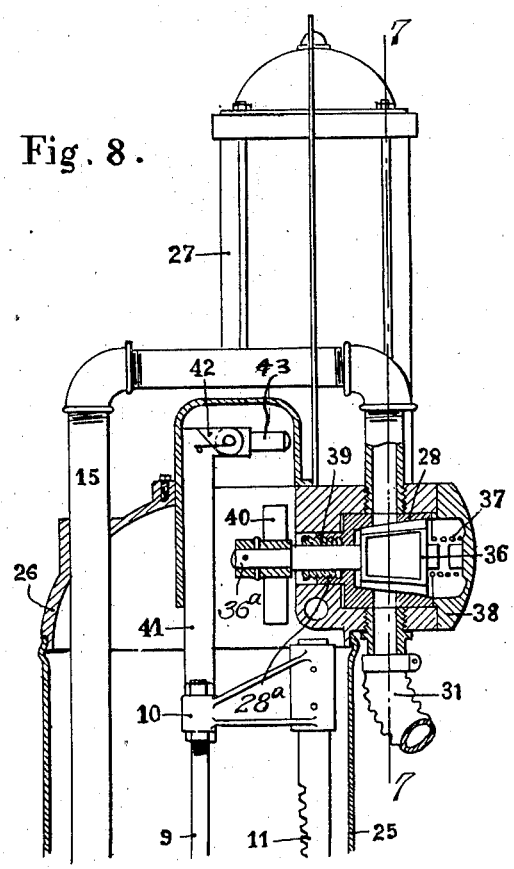
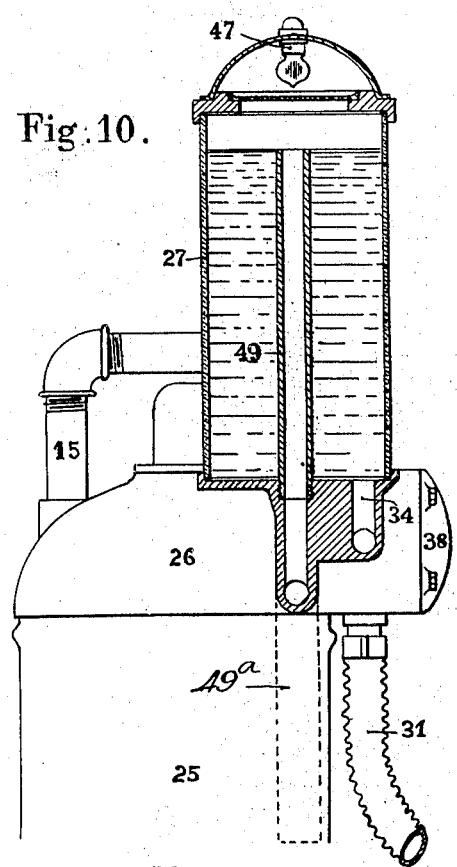
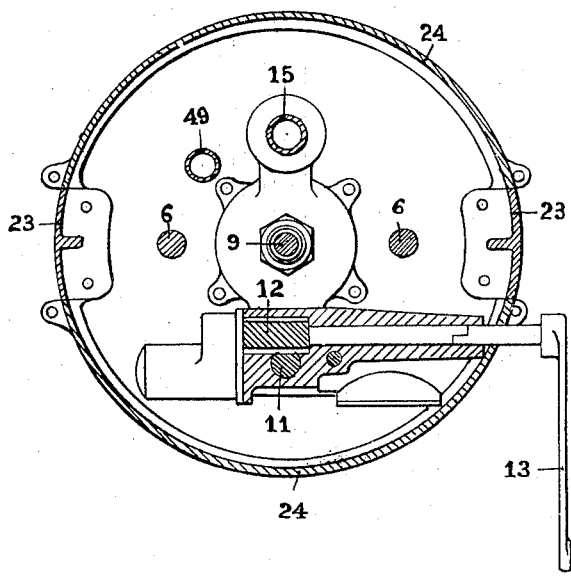
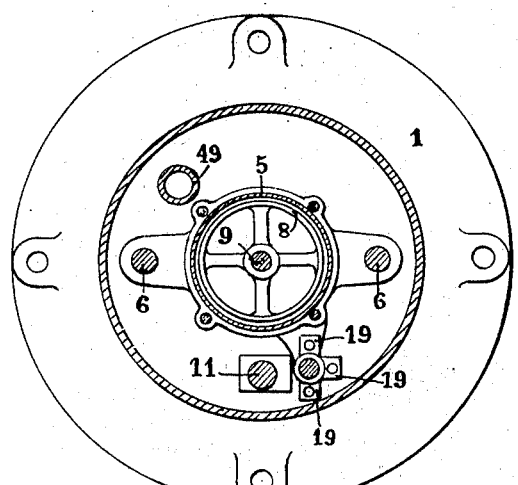
Inventor.
Henri Boutillon
by Munn & Co.
Attys.

Dec. 10, 1929.  H. BOUTILLON  1,739,437
DISTRIBUTING DEVICE FOR LIQUIDS
Filed March 31, 1924   6 Sheets-Sheet 5
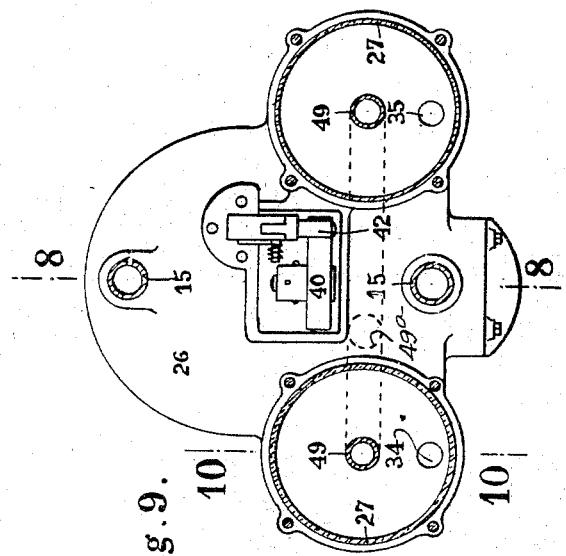
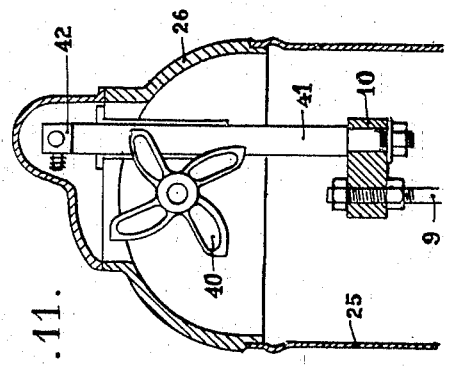
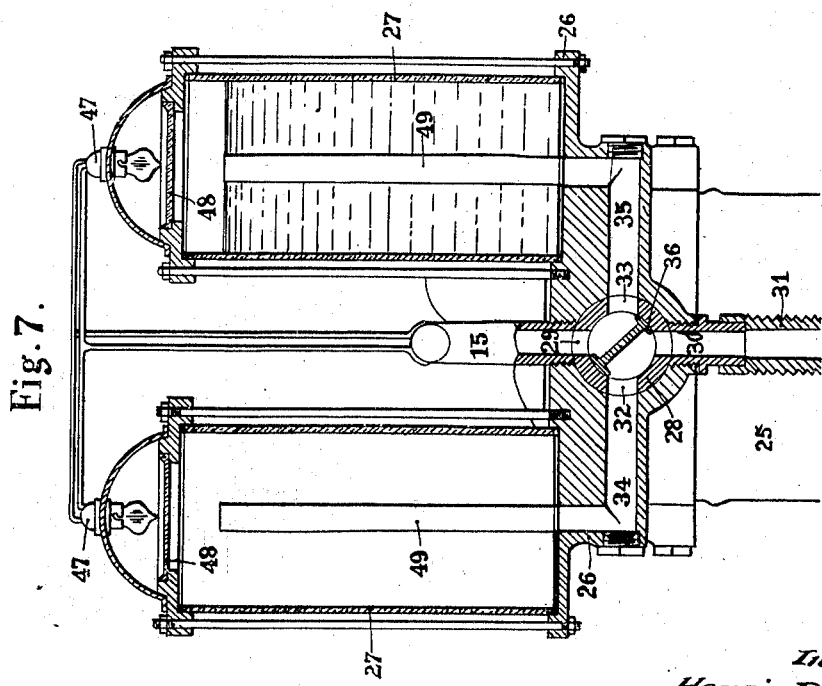
Inventor.
Henri Boutillon
by Munn &co.
Attys

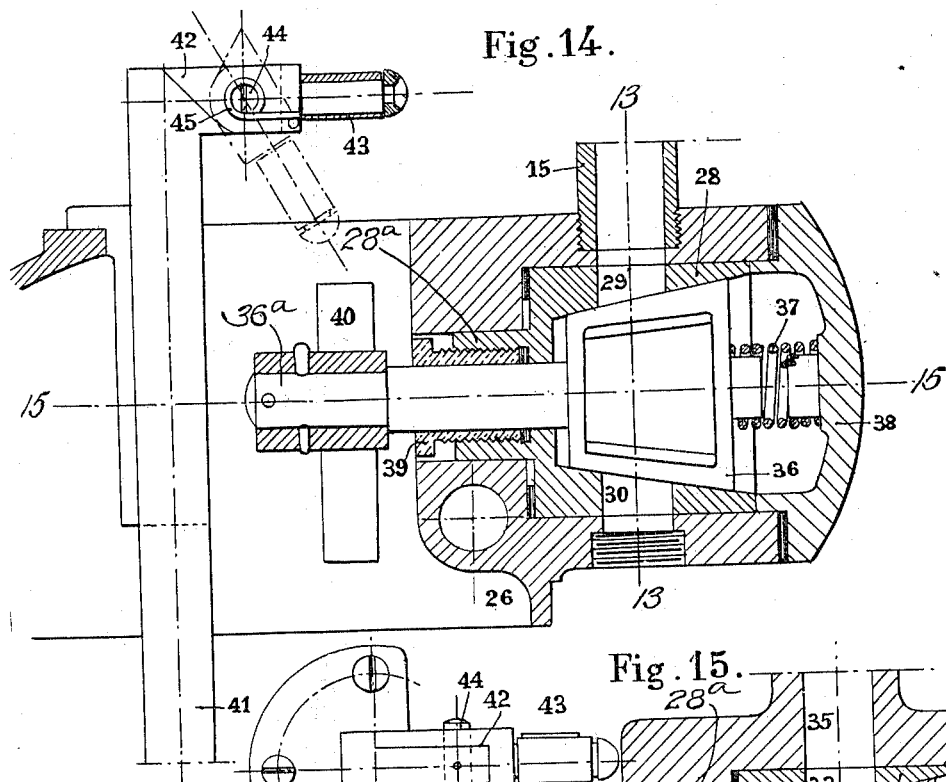
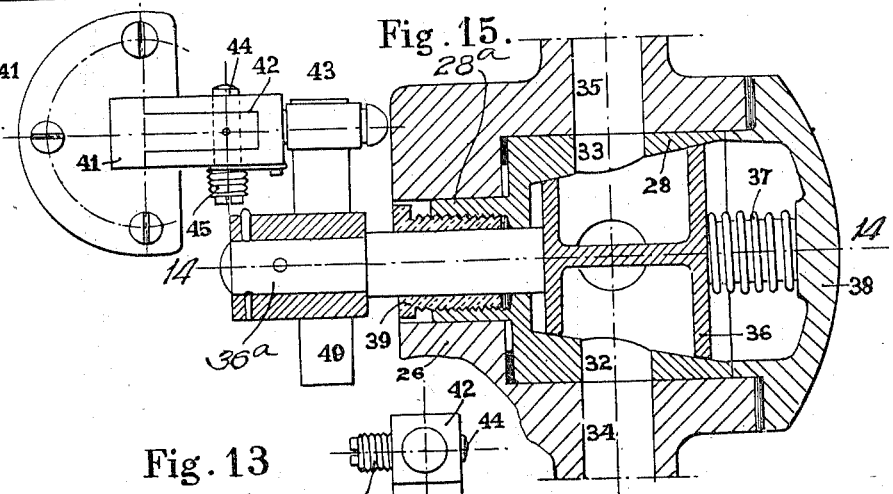
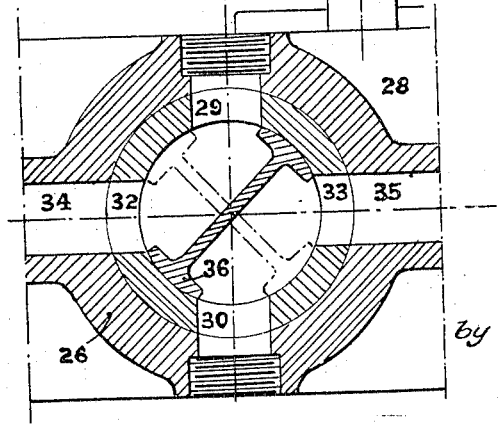

Patented Dec. 10, 1929

1,739,437

UNITED STATES PATENT OFFICE

HENRI BOUTILLON, OF SURESNES, FRANCE

DISTRIBUTING DEVICE FOR LIQUIDS

Application filed March 31, 1924, Serial No. 703,238, and in France June 13, 1923.

In apparatus for the distribution of liquid in exactly measured quantities by means of measuring reservoirs fed with the liquid to be distributed by a sucking reciprocating or rotary pump, it is necessary first to actuate the pump for approximately filling up the measuring reservoirs of the apparatus, then to operate the valves of these reservoirs for distributing the liquid they contain.

The working of the known apparatus is not therefore automatic, since it necessitates on the part of the person operating the apparatus successive operations which results in loss of time and may be the cause of errors in the distribution.

The present invention is adapted to remedy these inconveniences and has for an object a distributing apparatus having a sucking pump raising the liquid into measuring reservoirs arranged at the upper part of the apparatus which is essentially characterized by the fact that the rod of the piston of the sucking pump controls, through suitable members, a single valve so arranged as to regulate the admission and issue of the liquid in each of the measuring reservoirs.

According to the present invention, the rod of the piston of the pump is provided with a finger so arranged as to encounter, during the up and down strokes of the piston, the arms of a cross integral with the valve regulating the admission and issue of the liquid in each of the measuring reservoirs, this finger being pivoted in such a manner:

(a) As to move away when coming in contact with the cross and not to actuate the valve during the up stroke of piston (b) And then return to normal position for driving the said cross and actuating the valve during the down stroke of the piston and thus putting, in this new position of the valve, the filled up reservoir in communication with the outlet tube for the liquid and the empty reservoir in communication with the pump.

In order that the invention may be clearly understood, a form of construction of the automatic distributor forming the subject-matter of this invention will be described hereafter, by way of example only, with reference to the accompanying drawing in which:

Fig. 1 is a front view of the distributor.

Fig. 2 is a side view.

Fig. 3 is a vertical section of the lower part of the apparatus.

Fig. 4 is a corresponding sectional front view.

Figs. 5 and 6 are two horizontal sections made respectively according to lines 5—5 and 6—6 of Fig. 3.

Fig. 7 is a vertical longitudinal section made according to line 7—7 of Fig. 8.

Fig. 8 is a vertical section made according to line 8—8 of Fig. 9.

Fig. 9 is a plan view partly in section corresponding to Fig. 7.

Fig. 10 is a vertical section made according to line 10—10 of Fig. 9.

Fig. 11 is a detail partly in section and partly in elevation of the controlling means.

Fig. 12 is an elevation partly in section and on a larger scale of the controlling means.

Fig. 13 is a section on line 13—13 of Figure 14.

Fig. 14 is a section on line 14—14 of Figure 15.

Fig. 15 is a section on line 15—15 of Figure 14.

Figure 16 is a section on line 16—16 of Figure 3.

As shown in the drawing, the automatic measuring apparatus in accordance with the invention comprises a base 1 provided, at its lower part, with a tube 2 coupled to a central socket 3 of the said base and connected to a reservoir or other vessel containing the liquid to be distributed.

The upper part of the socket 3 carries a suction valve 4 and forms the bottom of the barrel of the sucking pump 5 which is secured on the base 1 by means of tie rods 6 and is connected to a cap or head 7 carrying all the driving parts.

The piston 8 of this sucking pump is provided with a valve, not shown, and is secured to a rod 9 connected by a triangular arm 10 to a rack 11 suitably guided in a case or sheath of the cap or head 7, and in engagement with a pinion 12 actuated from the exterior of the apparatus by a driving crank 13, by which means the piston 8 of the sucking pump is actuated. The rack 11 is provided with a stop 21 to limit its upward movement.

Upon each upward movement of this piston, the liquid which is above the same in the pump barrel is delivered, through an orifice 14 of the head 7, into the filling tube 15. The orifice 14 is provided with a filler 16 which retains the impurities of the liquid delivered and can be removed for cleaning purposes by taking off the plug 17.

The upper part of the apparatus is connected to the lower part by a second cap 22 having uprights 23 on which are hinged doors 24 forming with the uprights an enclosure for the driving mechanism when the apparatus is not in use.

On this cap 22 is secured a sheath or casing 25 connected to a flange 26 carrying the measuring reservoirs 27, said flange 26 being bored at its central part for receiving the shell 28 of a valve. The shell has, at its upper part, a port 29 with which is connected the filling tube 15 and, at its lower part, a second port 30 to which is connected the distributing tube 31.

This fixed shell has, moreover, two other ports 32 and 33 respectively communicating with channels 34 and 35 provided in the flange 26 and opening in the measuring reservoirs.

In this fixed shell 28 is fitted a distributing valve 36 which is pressed in the said shell by a spring 37 bearing against the said valve and against a cap 38 closing the shell 28. The other end of the shell 28 is reduced at 28ᵃ and carries a stuffing box 39 through which the valve stem 36ᵃ extends.

According to the present invention, this valve 36 carries on its stem 36ᵃ a cross 40 and the triangular arm 10 connecting the rod 9 of the piston and its driving rack is provided with a vertical arm 41 having, at its upper end, a finger 42, provided with a roller 43, and pivoted about an axis 44, the finger being held in a horizontal position by a spring 45.

This pivoted finger 42, which thus follows the piston of the pump during its up and down strokes, is so arranged as to operate the cross 40, and the stem of the valve 36 only on the downward movement of the piston.

During the upward movement of the piston, the finger 42 at the time it comes in contact with the arms of the cross 40, swings about its axis 44 so that it does not actuate, the valve 36 and that, if the latter occupies for instance the position illustrated in Fig. 13, the liquid delivered by the pump flows, through the conduit 15, shell 28 and channel 34, into the left-hand measuring vessel.

When this vessel is filled up, the pump piston is brought back to its starting position illustrated in Fig. 3. During this downward movement, the pivoted finger 42, held in a horizontal position by its spring 45, comes again in engagement with one of the arms of the cross 40 and causes the latter to rotate through a quarter of a revolution and, consequently, the valve with which it is rigid.

This valve then takes the position illustrated in dotted lines in Fig. 13, so that the measuring vessel which has just been filled, empties, the liquid flowing out through the channel 34, ports 32 and 30 of the valve 36 and the distributing conduit.

The movement of the valve 36 by the downward movement of the piston to the position just described, to empty the left hand measuring vessel, places the channel 35 leading from the right hand measuring vessel in communication with the filling tube 15 by means of the ports 29 and 33, so that upon the next upward movement of the piston the liquid raised thereby will pass into the right hand measuring vessel and fill the same. Upon the downward movement of the piston the valve 36 will be turned by the finger 42 and cross 40, so as to connect the channel 35 by ports 33 and 30 with the distributing conduit 31, and the said measuring vessel emptied. It will thus be seen that one measuring vessel is filled by the upward movement of the piston and the other emptied by the downward movement of the piston.

The measuring vessels are to be filled up to a predetermined level by the pump, and to prevent them from being filled beyond said level, an overflow pipe 49 is arranged in each vessel. The overflow pipes 49 are connected with a tube 49ᵃ connected with the container or reservoir, which contains the liquid to be distributed by the apparatus.

In the form of construction illustrated, the measuring apparatus in accordance with the invention is also provided with a partial counter 50 which comes into action at each displacement of the rack by means of an abutment 51 on the latter, whilst the pinion 12 actuating the said rack 11 controls a counter 46 totalizing the quantities of liquid distributed.

These devices are moreover indicated only by way of example as well as the lighting device arranged above the measuring reservoirs for permitting the visibility of the liquid at night, this lighting device comprising an incandescent lamp 47 arranged at the upper part of each reservoir at the center of a mirror 48 placed at the center of a cap closing the said reservoirs.

The constructional arrangements are, of course, given by way of example only; the forms, materials and dimensions of the various constituent parts as well as the details of execution may of course be modified without departing thereby from the principle of the invention.

Claims—

1. An apparatus for the distribution of liquids in predetermined quantities comprising a frame, a conduit for the admission of the liquid at the lower part of the frame, a sucking pump barrel connected with the conduit, a delivery pipe at the upper end of the pump barrel, means for actuating the pump, measuring reservoirs at the upper part of the frame, a distributing conduit, an overflow tube in each reservoir limiting the filling of the reservoirs, a member supporting the reservoirs and having passages communicating with the reservoirs, the distributing conduit and the delivery pipe, a valve in the member alternately permitting the delivery of the liquid to the reservoirs and alternately permitting emptying of the reservoirs, and means for actuating the valve from the pump actuating means.

2. An apparatus for the distribution of liquids in predetermined quantities comprising a frame, a conduit for the admission of the liquid at the lower part of the frame, a sucking pump barrel connected to the conduit and located in the frame, a delivery pipe at the upper end of the pump barrel, a piston in the pump barrel and movable in the latter between the admission and delivery pipes, a rod rigid with the piston, a vertical rack guided in the frame, a pinion in gear with the rack, a driving crank integral with the pinion, a member connecting the rack to the piston rod and transmitting to the piston the rectilinear displacements of the rack, measuring reservoirs at the upper part of the frame, a distributing conduit, an overflow tube in each reservoir for limiting the filling of these reservoirs, a member supporting the reservoirs and their overflow tubes, passages formed in the supporting member and communicating with the reservoirs, the distributing conduit, and delivery pipe, a valve in the supporting member alternately delivering the liquid to the reservoirs and permitting the alternate emptying of the reservoirs, means for operating the valve and means actuated by the piston of the pump for actuating the operating means of the valve on the downward movement of the piston, whereby one reservoir will be filled and the other simultaneously emptied.

3. An apparatus for the distribution of liquids in predetermined quantities comprising a frame, a conduit for the admission of the liquid at the lower part of the frame, a sucking pump barrel connected to the conduit, a delivery pipe at the upper end of the pump barrel, a piston in the pump barrel and movable in the latter, a rod secured to the piston, a vertical rack, a pinion in gear with the rack, a driving crank integral with the pinion, a member connecting the rack to the piston rod, measuring reservoirs at the upper part of the frame, a distributing conduit, an overflow tube in each reservoir for limiting the filling of the reservoirs, a member supporting the reservoirs and their overflow tubes, passages formed in the said supporting member and communicating with the reservoirs, the distributing conduit and the delivery pipe, a valve rotatably mounted in the supporting member and alternately permitting the delivery of the liquid to the reservoirs and the alternate emptying of the said reservoirs, a driving cross rigidly secured on the axis of the valve, and means moving with the piston of the pump for actuating this cross and driving the rotary valve on the downward movement of the piston.

4. In an apparatus for distributing liquids in predetermined quantities, two reservoirs, a pump communicating with the reservoirs and having a recpirocating piston provided with a piston rod, a discharge pipe, a valve casing communicating with the reservoirs, the pump and the discharge pipe, a valve in the casing controlling communication with the reservoir, an armed member carried by the valve, and means carried by the piston rod for operating the armed member only when the piston is moving in one direction, said means consisting of a pivoted and spring pressed finger.

5. An apparatus for the distribution of liquids in predetermined quantities comprising a frame, a conduit for the admission of the liquid at the lower part of the frame, a sucking pump barrel connected to the conduit, a delivery pipe at the upper end of the pump barrel, a piston in the pump barrel, a vertical rack connected with the piston, means for operating the rack, measuring reservoirs at the upper part of the frame, a distributing conduit common to said reservoirs, a member supporting the reservoirs, passages formed in the said member and communicating with the reservoirs, the distributing conduit and the delivery pipe of the pump, a valve rotatably mounted in the member and alternately delivering the liquid to the reservoirs and alternately emptying the said reservoirs, a driving cross rigidly secured to the axis of the valve, a vertical rod carried by the piston rod, a finger pivotally mounted on the said rod, an abutment for the said finger, a spring holding the finger in a horizontal position, the finger coming in contact, during displacements of the piston of the pump, with the branches of the cross controlling the valve and actuating the said cross only at the end of the down stroke of the piston so as to control the valve and to bring it in such position that the measuring reservoir which has been filled during the up stroke is put in communication with the said distributing conduit and that the other reservoir is put in communication with the delivery conduit of the pump.

6. In an apparatus for distributing liquids in predetermined quantities, two reservoirs, a pump communicating with the reservoirs, a piston having a piston rod, a supply pipe for the pump, means for reciprocating the piston of the pump, a discharge pipe, a valve casing communicating with the reservoirs, the pump and the discharge pipe, a valve for controlling the said communications, a member carried by the valve, and a member carried by the piston rod and adapted to engage the member of the valve to operate the valve when the piston is moving in one direction and not to operate it when moving in the other direction.

The foregoing specification of my "Distributing device for liquids" signed by me this 21st day of March 1924.

HENRI BOUTILLON.